United States Patent
Haak et al.

(10) Patent No.: US 12,479,510 B2
(45) Date of Patent: Nov. 25, 2025

(54) VEHICLE COMPRISING A TRANSVERSE ROOF BOW

(71) Applicant: Bayerische Motoren Werke Aktiengesellschaft, Munich (DE)

(72) Inventors: Johann Haak, Moosburg an der Isar (DE); Christian Schubert, Munich (DE); Jasmin Tahan, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 385 days.

(21) Appl. No.: 18/025,253

(22) PCT Filed: Oct. 1, 2021

(86) PCT No.: PCT/EP2021/077109
§ 371 (c)(1),
(2) Date: Mar. 8, 2023

(87) PCT Pub. No.: WO2022/073872
PCT Pub. Date: Apr. 14, 2022

(65) Prior Publication Data
US 2023/0312007 A1 Oct. 5, 2023

(30) Foreign Application Priority Data
Oct. 5, 2020 (DE) ..................... 10 2020 125 998.0

(51) Int. Cl.
*B62D 25/06* (2006.01)
*B60R 11/00* (2006.01)

(52) U.S. Cl.
CPC .............. *B62D 25/06* (2013.01); *B60R 11/00* (2013.01); *B60R 2011/0028* (2013.01)

(58) Field of Classification Search
CPC . B62D 25/06; B60R 11/08; B60R 2011/0028; B60R 11/00
See application file for complete search history.

(56) References Cited

U.S. PATENT DOCUMENTS

2003/0227413 A1 12/2003 Yokota et al.
2004/0080188 A1* 4/2004 Igarashi ................. B62D 25/06
296/203.04
(Continued)

FOREIGN PATENT DOCUMENTS

CN 1467872 A 1/2004
CN 108357324 A 12/2009
(Continued)

OTHER PUBLICATIONS

International Search Report (PCT/ISA/210) issued in PCT Application No. PCT/EP2021/077109 dated Jan. 17, 2022 with English translation (five (5) pages).
(Continued)

*Primary Examiner* — Daniel J Colilla
(74) *Attorney, Agent, or Firm* — Crowell & Moring LLP

(57) ABSTRACT

A vehicle has a transverse roof bow of a vehicle roof. The transverse roof bow extends in the transverse direction of the vehicle, being located above a seat region for vehicle occupants in the vertical direction of the vehicle, and adjoins, at least in some regions, a region of a vehicle interior from behind in the longitudinal direction of the vehicle. The region represents a free space for the head of a vehicle occupant to move. The transverse roof bow has two lateral regions and a central region connected thereto. The central region extends in the transverse direction of the vehicle. The central region is connected to the lateral regions in each case via a transition region. The transition regions extend towards the rear side of the vehicle obliquely between the lateral regions and the central region. A front side of the central region is at a distance from front sides of the lateral regions in the longitudinal direction of the vehicle.

12 Claims, 12 Drawing Sheets

(56) References Cited

U.S. PATENT DOCUMENTS

| | | | |
|---|---|---|---|
| 2015/0097395 A1 | 4/2015 | Faruque et al. | |
| 2018/0201325 A1 | 7/2018 | Arora et al. | |
| 2018/0208022 A1 | 7/2018 | Caliskan et al. | |
| 2019/0061625 A1* | 2/2019 | Göttlicher | B60R 1/001 |
| 2019/0344833 A1 | 11/2019 | Baccouche et al. | |
| 2020/0127371 A1* | 4/2020 | Lee | H01Q 1/3291 |

FOREIGN PATENT DOCUMENTS

| | | | | |
|---|---|---|---|---|
| CN | 103359181 A | | 10/2013 | |
| CN | 104228959 A | | 12/2014 | |
| CN | 108327795 A | | 7/2018 | |
| DE | 102005006201 A1 | * | 8/2006 | B62D 25/06 |
| DE | 10 2008 030 241 A1 | | 12/2009 | |
| DE | 10 2011 053 246 A1 | | 3/2013 | |
| DE | 20 2014 104 732 U1 | | 10/2014 | |
| DE | 10 2015 216 202 A1 | | 3/2017 | |
| DE | 10 2017 116 744 A1 | | 3/2018 | |
| DE | 10 2017 116 752 A1 | | 3/2018 | |
| DE | 20 2019 102 690 U1 | | 5/2019 | |
| EP | 1 419 953 A1 | | 5/2004 | |
| JP | 2005-324653 A | | 11/2005 | |

OTHER PUBLICATIONS

German-language Written Opinion (PCT/ISA/237) issued in PCT Application No. PCT/EP2021/077109 dated Jan. 17, 2022 (six (6) pages).

German-language Search Report issued in German Application No. 10 2020 125 998.0 dated Jun. 23, 2021 with partial English translation (10 pages).

English translation of Chinese-language Office Action issued in Chinese Application No. 202180052210.3 dated Nov. 7, 2024 (8 pages).

* cited by examiner

VEHICLE COMPRISING A TRANSVERSE ROOF BOW

BACKGROUND AND SUMMARY

The invention relates to a vehicle comprising a roof bow of a vehicle roof and, in particular, to a roof bow extending in a transverse direction of the vehicle that is arranged above a seat area for vehicle occupants in a vertical direction of the vehicle.

EP 1 419 953 A1 discloses a vehicle body structure having rear lateral frames which extend in the longitudinal direction of the vehicle. Furthermore, C and D-pillars are provided which run substantially in the vertical direction of the vehicle. Connection rigidity between the C-pillars and the D-pillars in the transverse direction of the vehicle is to be guaranteed by means of a substantially x-shaped arrangement of roof braces.

The roof braces run above a seat area of the vehicle. In order to achieve the necessary headroom below the roof braces in the vertical direction of the vehicle, a vehicle roof must be designed to be correspondingly high. As the roof height increases, however, the driving resistance of a vehicle rises to an unwanted extent. Furthermore, a great vehicle height has a detrimental effect on the overall aesthetic impact of the vehicle.

A motor vehicle with a double y-shaped roof area for achieving sufficient rigidity of the vehicle body is known from DE 10 2015 216 202 A1. The roof height of the motor vehicle must likewise be undesirably great, in order to create sufficient headroom for vehicle occupants.

DE 10 2017 116 752 A1, DE 10 2017 116 752 A1 and DE 20 2014 104 732 U1 each show a vehicle with a transverse roof bow of a vehicle roof. The transverse bow roof extends in the transverse direction of the vehicle, is arranged above a seat area for vehicle occupants in the vertical direction of the vehicle, and adjoins, at least in some regions from behind, a movement headroom for a vehicle occupant in a vehicle interior. Furthermore, the transverse roof bow has two lateral regions and a vertical central region connected thereto. The central region runs in the transverse direction of the vehicle. The lateral regions are configured to run obliquely towards the rear between the central region and the outsides of the vehicle.

The present invention is based on the problem of designing a vehicle with the lowest possible roof height, while at the same time providing the desired headroom for occupants of the vehicle, without having a detrimental effect on the rigidity of a vehicle body.

According to the invention, this problem is solved by a vehicle in accordance with the independent claims.

The vehicle according to the invention comprises a transverse roof bow which extends in the transverse direction of the vehicle, is arranged above a seat area for occupants of the vehicle in the vertical direction of the vehicle, and adjoins, at least in some regions, a region of a vehicle interior from behind in the longitudinal direction of the vehicle. The region provides freedom of movement for the head of a vehicle occupant.

The transverse roof bow comprises two lateral regions and a central region connected thereto. The central region runs in the transverse direction of the vehicle and may be connected to each of the lateral regions via a transitional region. The transitional regions may run obliquely between the lateral regions and the central region in the direction of the rear side of the vehicle. A front side of the central region in the longitudinal direction of the vehicle may be spaced apart from front sides of the lateral regions. In addition, the central region and the lateral regions may be arranged running substantially in the transverse direction of the vehicle.

The vehicle according to the invention has the high strength required in the transverse direction of the vehicle, on account of the transverse roof bow extending in the transverse direction of the vehicle. In addition, apart from a roof part, a rear windshield adjoining the roof part in the longitudinal direction of the vehicle, or a further roof part adjoining the roof part in the vertical direction of the vehicle, can also be correspondingly supported by the transverse roof bow.

In this case, the transverse roof bow may adjoin upper ends of B, C or D-pillars of the vehicle body with its lateral regions and be fixedly connected thereto.

The A-pillars in motor vehicle construction are the connections between the vehicle roof and what is known as the front bulkhead. The bulkhead represents part of the body in automobile construction and delimits the passenger compartment beneath the windshield. In automobiles with a front engine, the bulkhead closes off the engine compartment to the rear. The function of the bulkhead is to keep headwind, waste heat, noise and spray water away from passengers. In modern, self-supporting bodies, the bulkhead also has a stiffening function.

B-pillars produce the connections between the vehicle floor and the vehicle roof in the center of the passenger compartment. Many coupes and cabriolets, and very rarely, sedans too, have no B-pillar.

C-pillars form connections between the vehicle roof and wings or rear side walls which are arranged in the region of the vehicle tailgate, for example.

In the case of station wagons, vans and also SUV's (Sport Utility Vehicle), D-pillars are the fourth pillars. A station wagon is a body design for automobiles with a particularly large loading volume. The name is derived by combining automobile and truck, as the vehicle can both transport passengers and carry loads.

If the transverse roof bow runs in the transverse direction of the vehicle, for example between upper ends of B-pillars of the vehicle, a front side of the transverse roof bow facing the front side of the vehicle adjoins a region of the vehicle interior from behind which is provided above a front seat area for vehicle occupants.

If the transverse roof bow is arranged in the transverse direction of the vehicle running between the upper ends of C or D-pillars of the vehicle, for example, a front side of the transverse roof bow facing the front side of the vehicle adjoins from behind a region of the vehicle interior, or a head region, which is provided above a central or a rear seat area for vehicle occupants.

In this case, the term "adjoin" in the present case means that the transverse roof bow runs outside the region. In other words, the transverse roof bow is arranged behind the region in the longitudinal direction of the vehicle and not above the region in the vertical direction of the vehicle.

The region of the vehicle interior or the head region may extend in the longitudinal direction of the vehicle, in the transverse direction of the vehicle, and in the vertical direction of the vehicle, in such a manner in each case that the vehicle occupants have a desired headroom available to them in the longitudinal direction of the vehicle, between an outer side of the vehicle and a center of the vehicle. In the region of the center of the vehicle, the transverse roof bow is positioned with its center region in the longitudinal direction of the vehicle further forwards above the vehicle interior than the ends of the lateral regions. This means that the lateral regions of the transverse roof bow restrict the headroom of vehicle occupants less severely compared with solutions known in the art.

Moreover, in the transverse direction of the vehicle between the lateral regions of the transverse roof bow, a region of the vehicle interior beneath a roof part and/or beneath a rear windshield which is not provided in the case of solutions known from the prior art is delimited by the transverse roof bow and by the roof part and/or by the rear windshield. This region of the vehicle interior represents an installation space in which various vehicle components can be arranged without restricting headroom for vehicle occupants in the front and in the rear passenger compartment to an unwanted extent. In this way, there is in turn the possibility of a vehicle being configured with the desired low vehicle height, which has a positive effect on the driving resistance of a vehicle of this kind. In addition, a vehicle can then be designed to have a pleasing overall aesthetic impact.

In the present case, the term headroom or head area is understood to mean a space in the vehicle interior, the dimensions of which are limited in the vehicle interior to the front, to the side, to the top and to the bottom by defined distances from reference points or from defined reference surfaces of the vehicle in each case. This space is arranged in the vertical direction of the vehicle above a vehicle seat or above the seat surface of the vehicle seat, which represents, for example, the reference surface for the spatial extent of the space downwards, and is also referred to as the head bell. The head bell is of such a size that the largest possible number of users in a user population has a sufficiently great freedom of movement around the head of a vehicle occupant, starting from a head position adopted by the head in a central sitting position, while at the same time taking account of an adjustment range of a vehicle seat. Taking into account a variation in body size of between the 5th percentile for women and the 95th percentile for men means that approximately 95% of the relevant user population is covered.

If a rear side of the central region of the transverse roof bow is spaced apart from rear sides of the lateral regions in the longitudinal direction of the vehicle, the transverse roof bow can also be configured with a sufficiently large cross section in the central region. A high rigidity of a vehicle body can then also be realized in the front roof area, i.e. particularly in the region of the upper ends of the B, C and/or D-pillars. The transverse roof bow does not extend with its lateral regions in the longitudinal direction of the vehicle into the head region, as is the case with vehicle bodies known in the art. As a result, the headroom for vehicle occupants is not restricted to the rear and to the top by the transverse roof bow.

In a further embodiment of the vehicle according to the invention, at least one vehicle component is provided in a region of the vehicle interior. The region is arranged in the longitudinal direction of the vehicle behind the rear side of the central region of the transverse roof bow and in the transverse direction of the vehicle between the lateral regions and is located below at least one roof part and/or the rear windshield. The vehicle component in this case may, for example, be set up to capture the area surrounding a vehicle, such as a camera or the like, and/or to establish a radio link between a further vehicle component and an external device.

The vehicle component may be arranged in the vertical direction of the vehicle between the vehicle roof and/or a rear windshield and a headliner. The vehicle is then easily able to give a visual impression of high-quality.

A particularly good support of the rear windshield and a roof part which adjoins the rear windshield in the longitudinal direction of the vehicle, or of roof parts that are adjacent to one another, is provided in a further embodiment of the vehicle according to the invention. In this embodiment, the transverse roof bow is arranged in the longitudinal direction of the vehicle below a connection region or below a joint region between the rear windshield and the roof part or between the roof parts. It may be provided in this case that the rear windshield and the roof part overlap in the connection region in the longitudinal direction of the vehicle and the roof part to be arranged below the rear windshield.

The rear windshield may be provided with an opaque layer on its upper side, at least above the region where it overlaps with the roof part and above the transverse roof bow. This layer may be a baked-in ceramic paint, for example, which protects the adhesive regions between the rear windshield and the vehicle body from UV radiation and also enables a vehicle to have the desired high overall aesthetic impact.

The roof part or the vehicle roof may be produced from glass, plastic, fiber-reinforced plastic and/or metal, in particular steel or aluminum, so that the vehicle can be adapted to different customer requirements.

Furthermore, it may be provided that the rear side of the transverse roof bow protrudes backwards in the longitudinal direction of the vehicle over a rear side of the roof part which faces the rear windshield and which is provided below the rear windshield.

In addition, it is also possible for the rear side of the transverse roof bow to protrude backwards in the longitudinal direction of the vehicle over a rear side of a front first roof part facing a second rear roof part.

A rear side of the headliner may adjoin the rear windshield and be configured with a cutout through which a camera is guided. A field of view of the camera can then easily be used to its full extent, although the camera is arranged behind an interior lining and is not visible to vehicle occupants.

In addition, it is also possible for the transverse roof bow to be designed with outer regions which each extend above the vehicle body in the region of the outer sides of the vehicle in the longitudinal direction of the vehicle. In this case, the outer regions can be operatively connected to the ends of the lateral regions of the transverse roof bow, which each face the outer sides of the vehicle.

In addition, it may be provided that a front side of the transverse roof bow is positioned higher in the vertical direction of the vehicle than a rear side of the transverse roof bow. This is particularly advantageous if the vehicle according to the invention has a sloping silhouette in the rear roof region, since the desired headroom can then still be made available despite this.

The transverse roof bow may comprise an upper part and a lower part which delimit a cavity. The upper part may, in addition, have a wall region which protrudes into the cavity from an upper side of the upper part in the direction of the lower part. The upper side of the upper part may be adjacent to the wall region. The wall region delimits an installation space for receiving at least one optical vehicle component in the vertical, longitudinal and transverse directions of the transverse roof bow unit.

For easy assembly of the optical vehicle component, the installation space may be configured with a receiving opening in the region of the upper side of the upper part.

The design of the transverse roof bow with the preferably trough-like installation space makes it possible for an optical vehicle component, such as a camera or the like, to be arranged at least partially below an outer skin of a vehicle or a vehicle roof in a structurally simple manner. As a result, unwanted flow separations in the region of the optical vehicle components, with the resulting detrimental effects on driving comfort, can easily be reduced or avoided.

Furthermore, the overall aesthetic impact of existing vehicles is impaired to a lesser extent than with conventional solutions by the at least partial arrangement of an optical vehicle component in the installation space of the transverse roof bow. This is the case because the silhouette of an existing vehicle is altered to a lesser extent by an optical vehicle component which is at least partially recessed beneath the outer skin of the vehicle than an optical vehicle component which is located entirely outside the outer skin.

In addition, an optical vehicle component can be arranged to the desired extent in the region above a windshield or also in the region above a rear windshield. An optical field of view of the optical vehicle component is then restricted neither to the front in the longitudinal direction of the vehicle nor to the rear in the longitudinal direction of the vehicle.

In the present case, an optical field of view of an optical device is understood to mean the area in the field of view of an optical device, the image area of a camera or the like, within which events or changes can be noticed and recorded.

In order to be able to provide the transverse roof bow with the desired rigidity, the upper part and/or the lower part of the transverse roof bow can each be configured with at least one stamping.

In addition, in the present case a stamping is understood to mean a step with a defined shape which is pressed into a preferably thin-walled component, such as the upper part and the lower part of the transverse roof bow. The stampings are used to stiffen the upper part and/or the lower part. In this way, the bending resistance of the transverse roof bow can be increased and the tendency of the transverse roof bow to vibrate can be reduced.

Provision can be made for the upper part and/or the lower part to be configured with burls, beads, seams and folds, or the like. In this case, burls are punctiform depressions or elevations, while beads may be provided in the form of channel-shaped depressions or linear elevations. Short beads are also referred to as stiffening beads. Linear elevations are often also referred to as ribs. Seams are edges or folds which often have an L-shaped or Z-shaped design in the form of a step.

The wall region of the upper part may have lateral wall sections. The lateral wall regions may be provided between the upper side of the upper part and a bottom section of the wall region, in order to shield a vehicle interior of a vehicle from the area surrounding the vehicle to the desired extent. Furthermore, it may be provided that the lateral wall regions form an obtuse angle with the upper side of the upper part. The angle may have angle values in a range from 90° to roughly 135°.

This means that undercuts in respect of the upper side can easily be avoided. In addition, it is thereby ensured that only low stresses occur in the transitions between the lateral wall regions and the upper side and between the lateral wall sections and the bottom section.

For this purpose, the wall region of the upper part may have an approximately trapezoidal cross-section in the longitudinal direction and/or in the transverse direction.

The upper side of the upper part may have a recess in the vertical direction, at least in the region of one of the lateral wall sections which run in the longitudinal direction of the transverse roof bow, the recess extending in the longitudinal direction. The optical vehicle component can then easily be connected by lines to further vehicle components, such as a control unit, a computing unit, or the like. This is the case because the lines can be conducted out of the installation space with little effort through the gap in the recess, which represents a cutout.

In addition, a cover or a screen can be provided, which is arranged above the installation space and above the upper side of the upper part. By means of the cover, the installation space can be covered and preferably sealed off from the environment with little effort.

The cover may be configured with a scoop which rises in respect of an upper side of the cover. In addition, it is possible for the scoop to have an opening adapted to the optical field of view of an optical vehicle component or a transparent area in such a manner that the surroundings can be captured over the entire optical field of view of an optical vehicle component.

In addition, a further transverse roof bow or a so-called support frame may be provided, which rests at least in sections on the upper side of the upper part at least in an area surrounding the wall region and engages with the installation space. By means of a support frame of this kind, a desired support surface for a roof part, such as a glass roof part or the like, can be provided without having to structurally design the upper part and/or the lower part of the transverse roof bow in a particular manner for this purpose.

Furthermore, a vehicle having a transverse roof bow presented in greater detail above and having a camera that is arranged in the installation space of the transverse roof bow is proposed.

If the transverse roof bow forms a rear windshield frame or a windshield frame, then an optical field of view of the camera is not restricted to the rear or to the front in the longitudinal direction of the vehicle.

Further advantages and advantageous developments of the invention result from the patent claims and the exemplary embodiments described in principle with reference to the drawings.

DETAILED DESCRIPTION OF THE DRAWINGS

Figure 1:
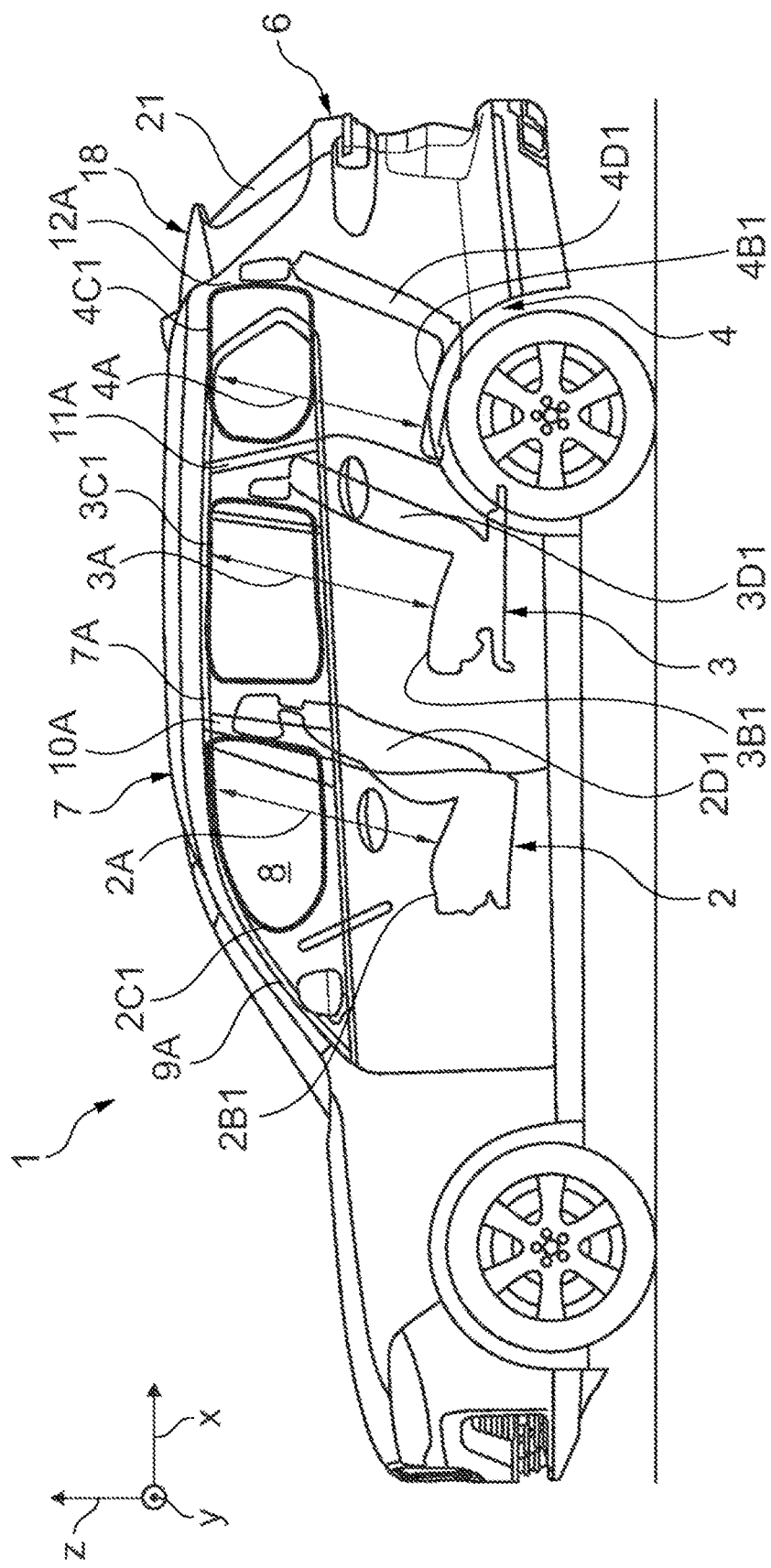
FIG. 1 shows a simplified side-view representation of an SUV known from the prior art.

FIG. 1 shows a vehicle 1 which is a so-called SUV. The vehicle is designed with three rows of seats 2, 3, 4, which are arranged one behind the other in the longitudinal direction of the vehicle x. The first or front row of seats 2 provides space for a driver and a passenger, while the second or middle row of seats 3 is provided in the front of the vehicle. The rear or third row of seats 4 is arranged in the rear region of a vehicle interior 8. Backrests 4D1, 4D2 of the third row of seats 4 can be moved into a horizontal position where necessary, so that the largest possible loading capacity can be provided in the rear region of the vehicle interior 8. The rear region of the vehicle interior 8 is accessible via what is known as a tailgate 6.

An interior height 2A of the first row of seats 2 extends from seat surfaces 2B1, 2B2 to a lower edge 7A of a vehicle roof 7 in the vehicle interior 8. Furthermore, an interior height 3A in the region of the second row 3 of seats 3B1, 3B2 extends to the lower edge 7A of the vehicle roof 7. In addition, an interior height 4A in the region of the third row of seats 4 is limited by seat surfaces 4B1, 4B2 and the lower edge 7A of the vehicle roof 7 above the seat surfaces 4B1, 4B2.

The vehicle 1 comprises A-pillars 9A, 9B, B-pillars 10A, 10B, C-pillars 11A, 11B and, in addition, D-pillars 12A, 12B. In this case the first row of seats 2 in the longitudinal direction of the vehicle x is at the height of the B-pillars 10A, 10B, the second row of seats 3 is arranged in the region of the C-pillars 11A, 11B and the third row of seats 4 in the transverse direction of the vehicle y between the D-pillars 12A, 12B.

Figure 2:
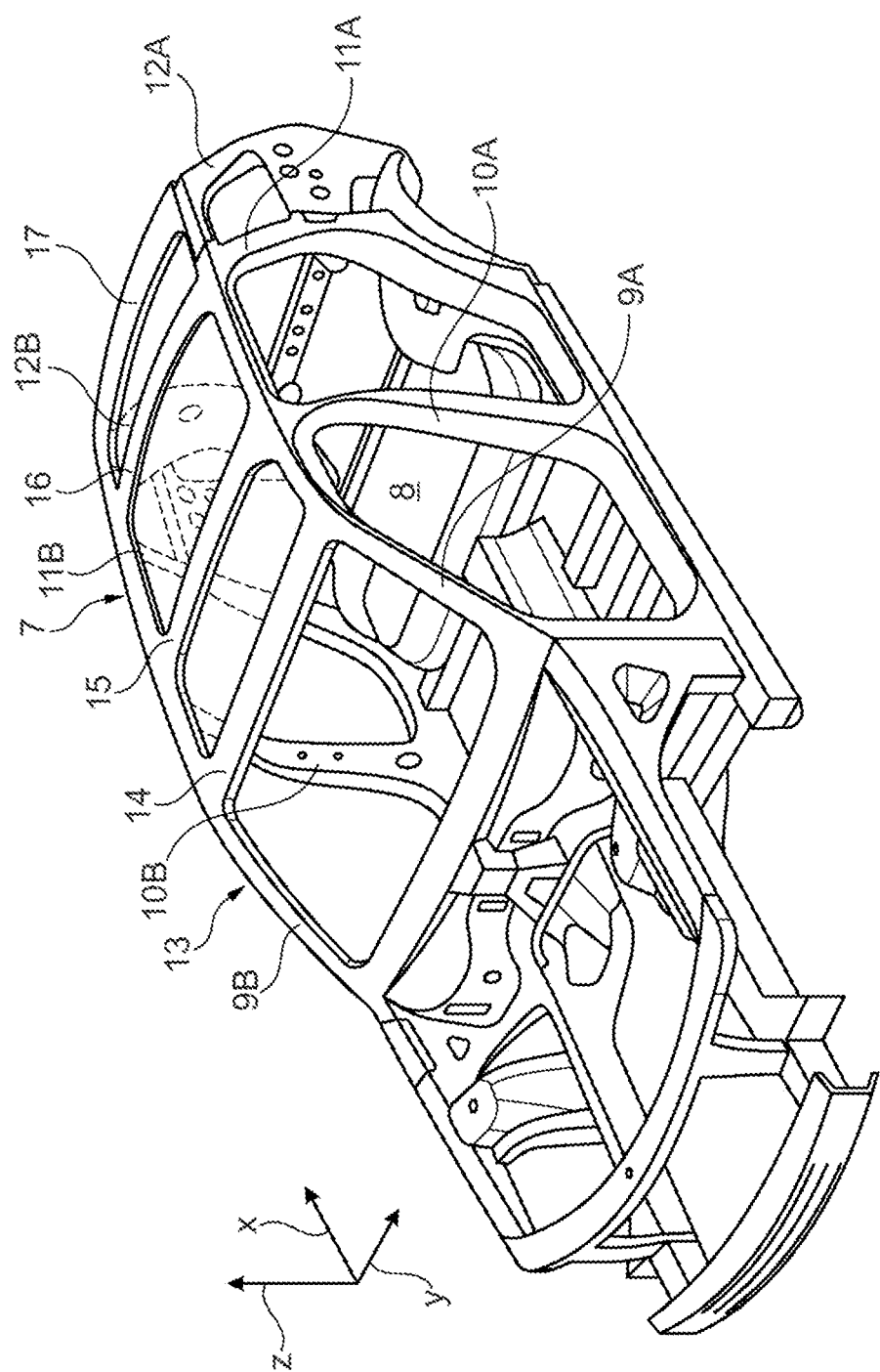
FIG. 2 shows a three-dimensional view of a vehicle body of an SUV known from the prior art.

FIG. 2 shows a schematic representation of a vehicle body 13 of the vehicle 1, which has a plurality of transverse roof bows 14 to 17 running in the transverse direction of the vehicle y in the region of the vehicle roof 7. In this case, the transverse roof bow 14 is connected to upper regions of the A-pillars 9A, 9B and represents an upper cowl. The further transverse roof bow 15 extends in the transverse direction of the vehicle y between upper ends of the B-pillars 10A, 10B, while the further transverse roof bow 16 is positioned to run between the C-pillars 11A, 11B. In the longitudinal direction of the vehicle x, the transverse roof bow 17 adjoins the transverse roof bow 16, which is in turn provided between upper ends of the D-pillars 12A, 12B. The transverse roof bow 17 is provided substantially in the region of the rear end of the vehicle roof 7, the rear end of the vehicle roof 7 adjoining the tailgate 6 in an upper region 18 in the present case.

The transverse roof bows 14 to 17 shown in FIG. 2 have a course which is known in the art and is substantially rectilinear in the transverse direction of the vehicle y. This means that they limit the interior heights 2A to 4A in the region of seat rows 2 to 4 in the vertical direction of the vehicle z. In order to be able to provide the desired headroom for vehicle occupants who are seated in the region of seat rows 2 to 4, the vehicle roof 7 must be of a corresponding height.

Figure 3:
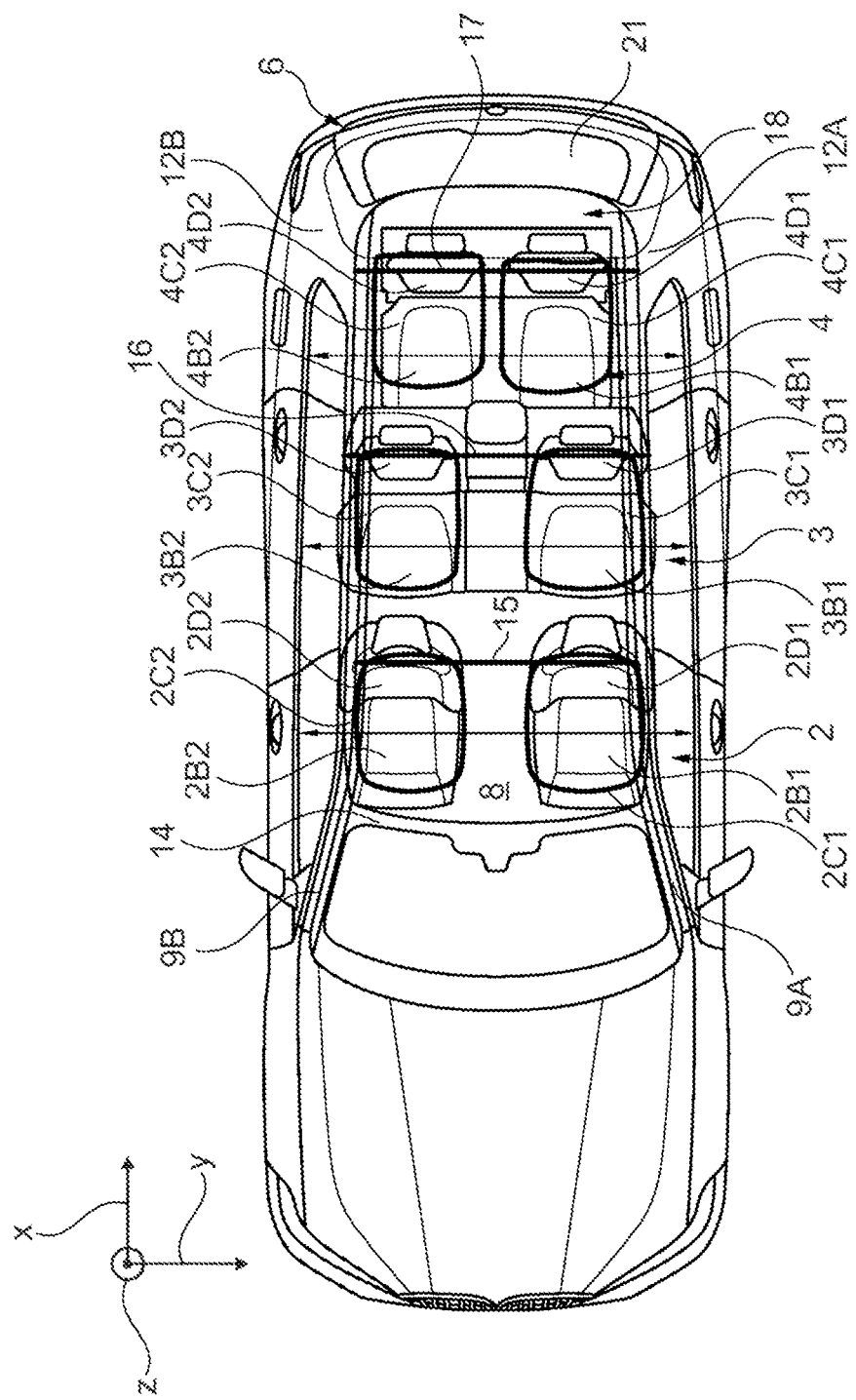
FIG. 3 shows the SUV vehicle according to FIG. 1 as a view from above.

In FIGS. 1 and 3, so-called head bells 2C1 to 4C2 are graphically reproduced in the region of the seat rows 2 to 4 in each case, which are regions of the vehicle interior 8 above the seat surfaces 2B1 to 4B2. The head bells 2C1 to 4C2 in this case extend to below the vehicle roof 7 and define the desired headroom for vehicle occupants. The head bells 2C1 to 4C2 extend in the longitudinal direction of the vehicle x, in the transverse direction of the vehicle y, and in the vertical direction of the vehicle z above the seat surfaces 2B to 4B of the seat rows 2 to 4, starting in each case from backrests 2D1 to 4D2 of the seat rows 2 to 4 to the front, to the top and to the side. It emerges from the depiction in FIG. 3, in which the transverse roof bows 15, 16 and 17 are each indicated schematically as solid lines, that the transverse roof bows 10 to 12 run above the seat surfaces 2C1 to 4D2 in the transverse direction of the vehicle y through the head bells 2C1 to 4C2, when these have the rectilinear course known per se in the transverse direction of the vehicle y.

Figure 4:
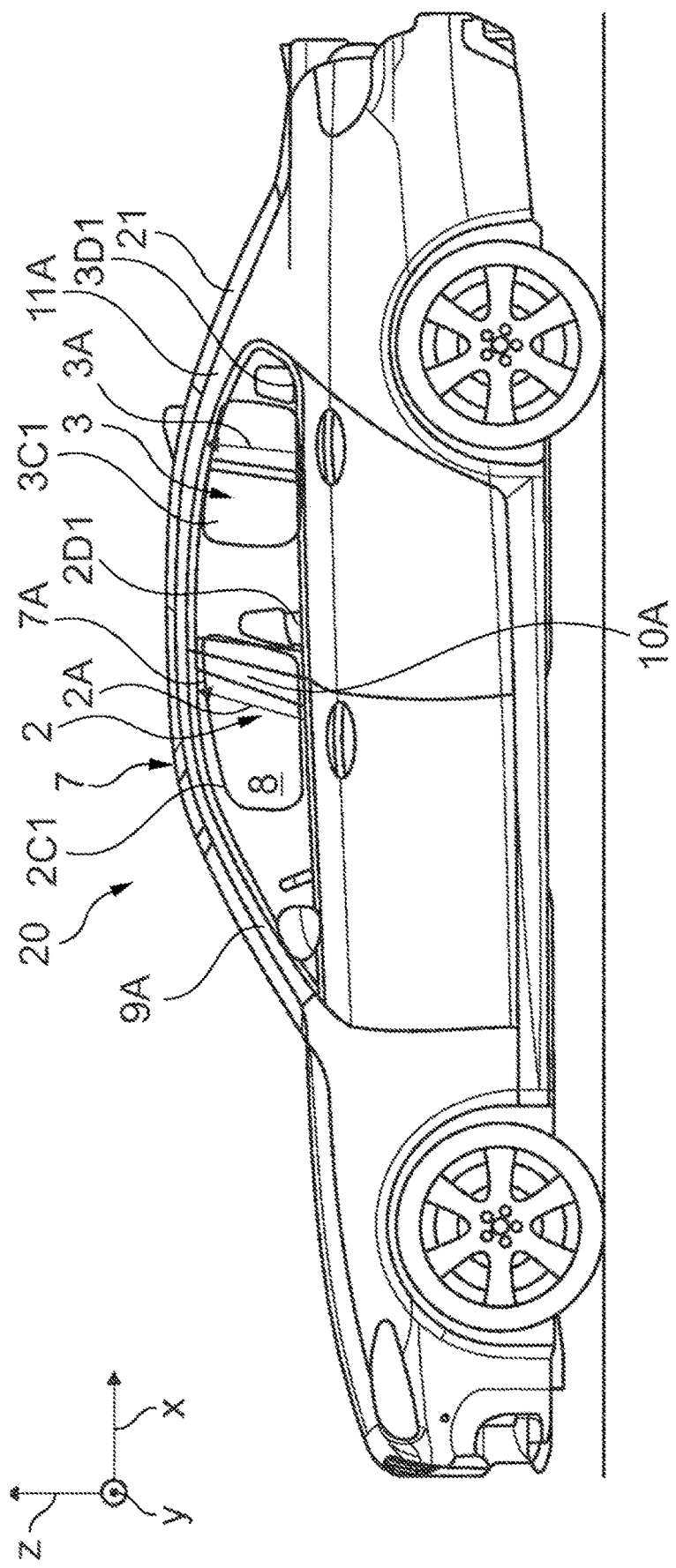
FIG. 4 shows a side view of a vehicle designed as a sedan.
Figure 5:
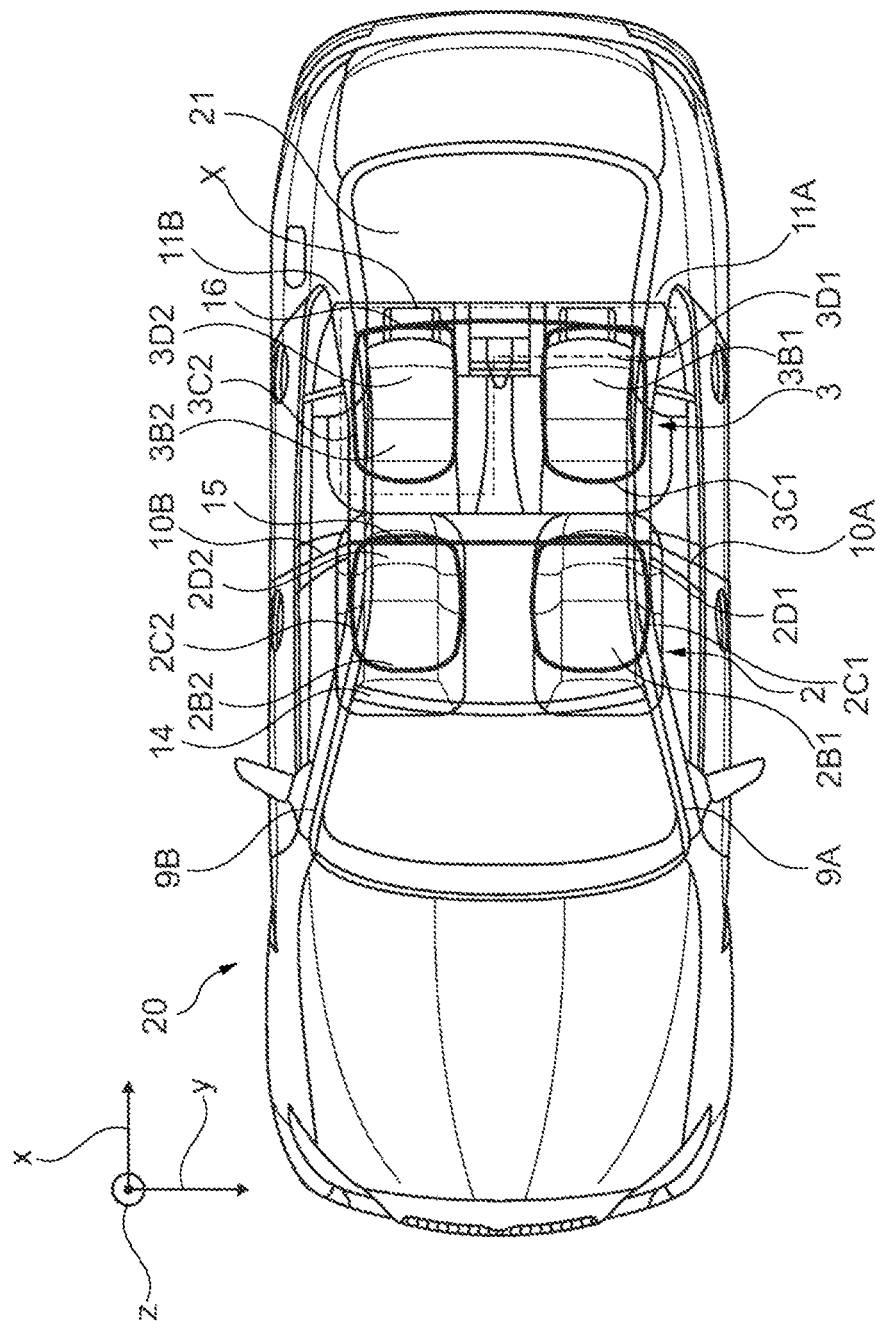
FIG. 5 shows the vehicle according to FIG. 4 as a view from above.

FIG. 4 shows a side view corresponding to FIG. 1 of a further vehicle 20 which is designed as a sedan. In addition, the vehicle 20 is shown in FIG. 5 as a view from above. The vehicle 20 includes A-pillars 9A, 9B, B-pillars 10A, 10B and C-pillars 11A, 11B and a front row of seats 2 and a rear row of seats 3. In addition, the vehicle 20 is designed with a transverse roof bow 14 which simultaneously represents a windshield frame in the present case. A further transverse roof bow 15 is provided in the region of the B-pillars 10A, 10B. In addition, the vehicle 20 comprises a third transverse roof bow 16 in the region of the transition between the vehicle roof 7 and a rear windshield 21. Above the seat surfaces 2B1, 2B2 and 3B1, 3B2, respectively, head bells 2C1 to 3C2 are in turn indicated in FIG. 4 and FIG. 5.

Both the outer skin of the vehicle roof 7 of the vehicle 1 and the outer skin of the vehicle roof 7 of the vehicle 20 may be produced using glass, plastic, fiber-reinforced plastic and/or metal in the region of the transverse roof bows 14 to 17 or 14 to 16.

Figure 6:
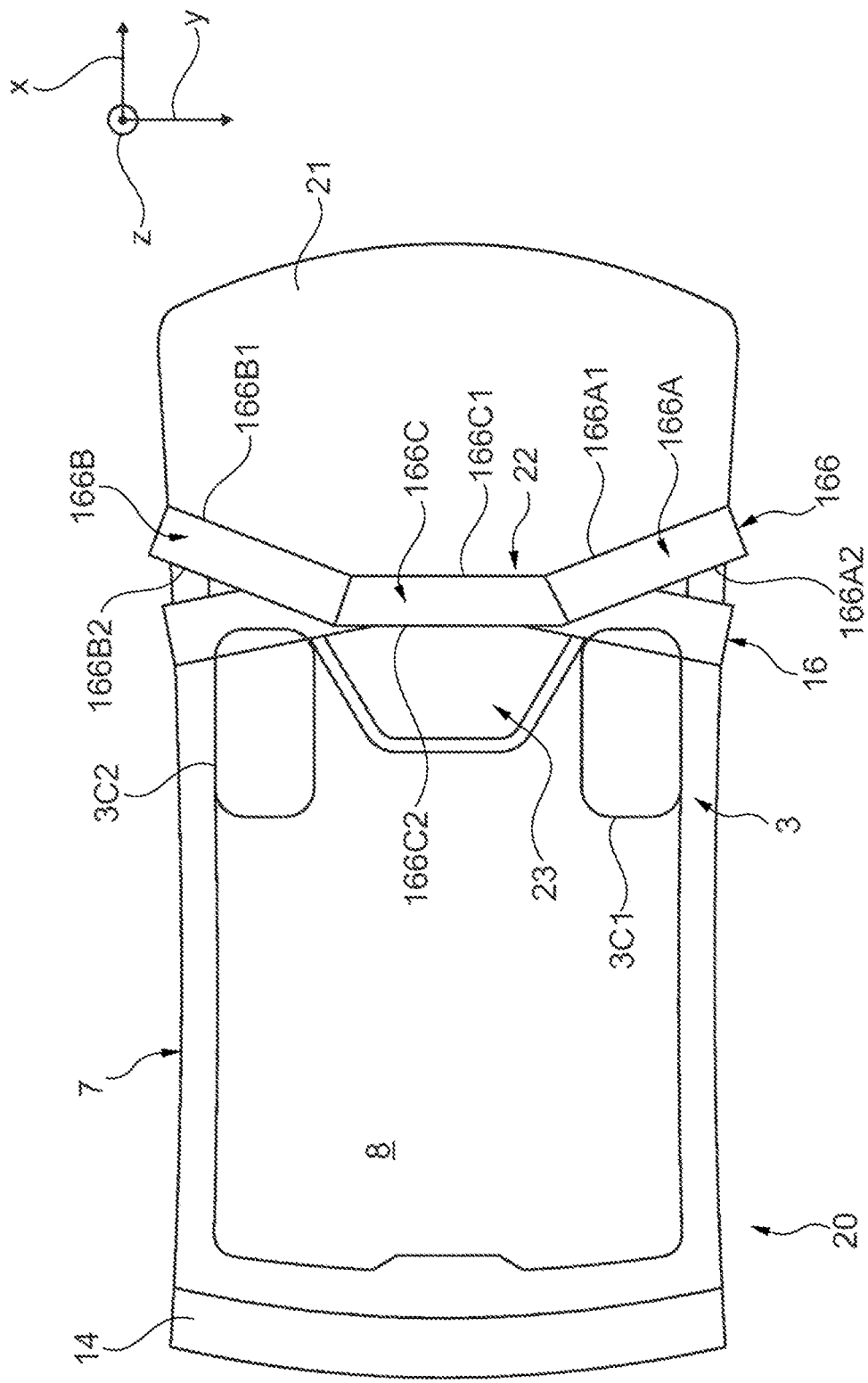
FIG. 6 shows a greatly simplified representation of a comparison between a transverse roof bow known in the art and another transverse roof bow as a view from above.

FIG. 6 shows a comparison between a rectilinear embodiment of the transverse roof bow 16 of the vehicle 20 according to FIG. 4 known in practice and an embodiment of the transverse roof bow 166 which is configured with lateral regions 166A and 166B running obliquely to the rear. A central region 166C is provided between the lateral regions 166A and 166B of the transverse roof bow 166, which central region is arranged above the second row of seats 3 running substantially in the transverse direction of the vehicle y. It emerges from the representation according to FIG. 6 that the transverse roof bow 166 is no longer arranged with its lateral regions 166A and 166B in the vertical direction of the vehicle z above the head bells 3C1 and 3C2, due to the angular arrangement of the lateral regions 166A and 166B. The transverse roof bow 166 does not therefore restrict the headroom of vehicle occupants who are seated in the region of the rear row of seats 3 in the vehicle 20.

A desired interior height 3A can be depicted with a simultaneously lower roof height as a result of the laterally set design of the transverse roof bow 166 or the sweep of the transverse roof bow 166. Since the roof height of the vehicle roof 7 in the region of the C-pillars 11 can be made lower than in a vehicle 20 with a rectilinear transverse roof bow 16, the driving resistance of the vehicle 20 is lower, which has a beneficial effect on the fuel consumption or energy consumption of the vehicle 20. In addition, the lower roofline of the vehicle roof 7 means that the vehicle 20 can be realized to have a better overall aesthetic impact, which is particularly desirable in vehicles with sporty pretensions.

Furthermore, in the transverse direction of the vehicle and in the longitudinal direction of the vehicle, an installation space 22 is delimited between the lateral regions 166A and 166B and in the longitudinal direction of the vehicle x behind the central region 166C, in which construction space one or multiple vehicle components, such as a camera, a radio device or the like, can be arranged, without restricting the headroom for vehicle occupants in the region of the rear row of seats 3.

Figure 7:
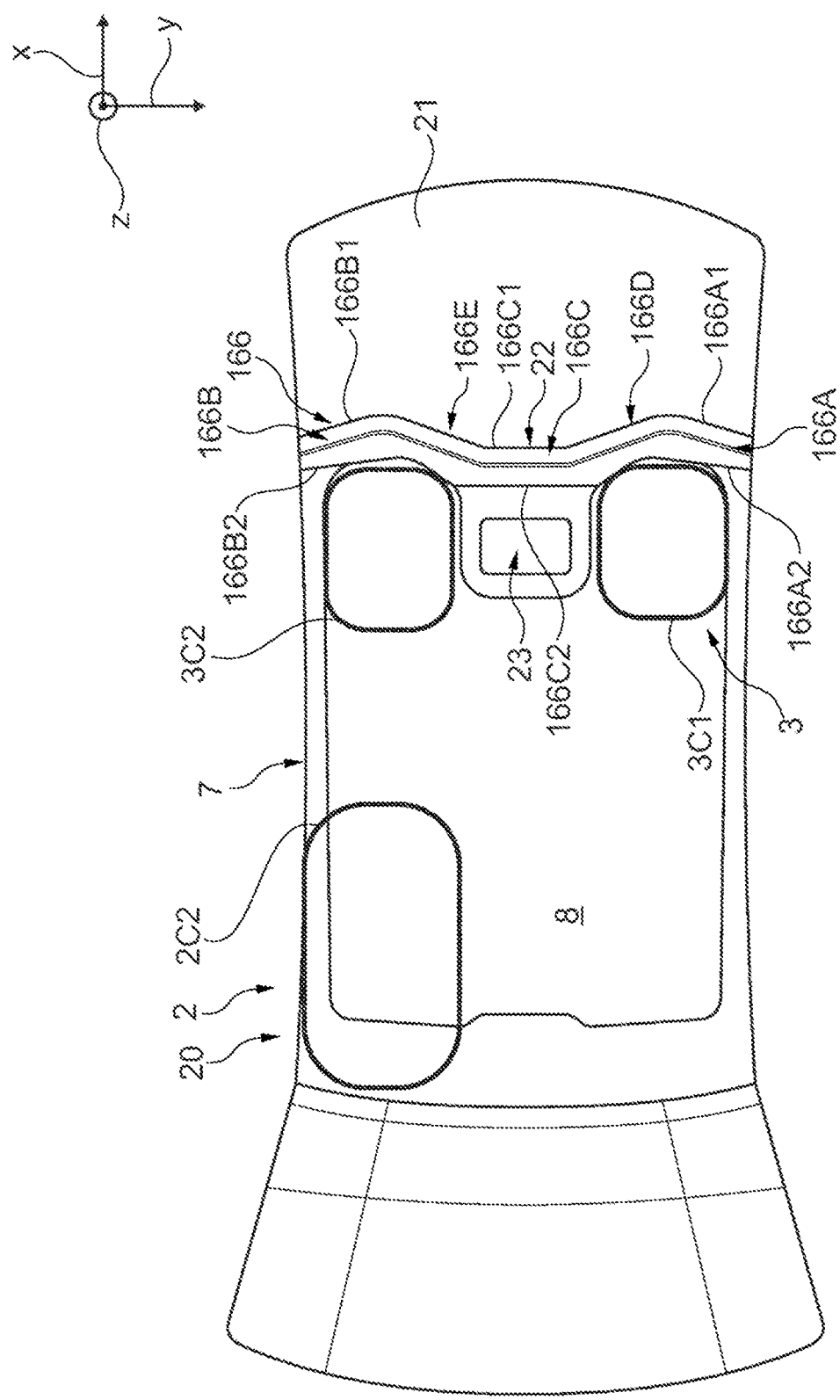
FIG. 7 shows a representation corresponding to FIG. 6 of a transverse roof bow designed according to the invention which extends in the transverse direction of the vehicle and is positioned running between C-pillars.

In addition, a region 23 in which further vehicle components, such as antennas or the like, are arranged is provided in the longitudinal direction of the vehicle x in front of the central region 166C of the transverse roof bow 166 and in the transverse direction of the vehicle y between the head bells 3C1 and 3C2, FIG. 7 shows an embodiment of the transverse roof bow 166. In the case of the roof bow 166 according to FIG. 7, the roof bow 166 again comprises the two lateral regions 166A and 166B and the central region 166C. The central region 166C runs parallel to the transverse direction of the vehicle y. A transitional region 166D or 166E is provided between the central region 166C and the lateral regions 166A or 166B in each case, which are each arranged between the central region 166C and the lateral regions 166A, 166B, running obliquely to the rear. The two lateral regions 166A and 166B run between the transitional regions 166D and 166E and the outer sides of the vehicle, substantially obliquely to the front and are set slightly in relation to the transverse direction of the vehicle y. In principle, the transverse roof bow 166 according to FIG. 7 has a so-called cranked course.

A front side 166C2 of the central region 166C is spaced apart from, or arranged in front of, front sides 166A2, 166B2 of the lateral regions 166A, 166B in the longitudinal direction of the vehicle x. At the same time, a rear side 166C1 of the central region 166C is also spaced apart from, or positioned in front of, rear sides 166A1, 166B1 of the lateral regions 166A, 166B in the longitudinal direction of the vehicle x.

The cranked course of the transverse roof bow 166 according to FIG. 7 on the one hand provides the advantage that the transverse roof bow 166 is arranged behind the head bells 3C1 and 3C2 in the longitudinal direction of the vehicle x. In addition, in the transverse direction of the vehicle y and in the longitudinal direction of the vehicle x between the transitional regions 166D and 166E and in the longitudinal direction of the vehicle x behind the central region 166C, an installation space 22 is delimited, in which one or multiple vehicle components, such as a camera, a radio device or the like, can be arranged without restricting the headroom of vehicle occupants in the region of the rear row of seats 3.

In addition, a region 23 is provided in the longitudinal direction of the vehicle x in front of the central region of the transverse roof bow 166 and in the transverse direction of the vehicle y between the head bells 3C1 and 3C2, in which further vehicle components, such as antennas or the like, are arranged.

As an alternative to the course of the transverse roof bow 166 shown in FIG. 7, it is also possible, depending on the existing application in each case, for the two lateral regions 166A and 166B and the central region 166C to run substantially parallel to the transverse direction of the vehicle y.

Figure 8:
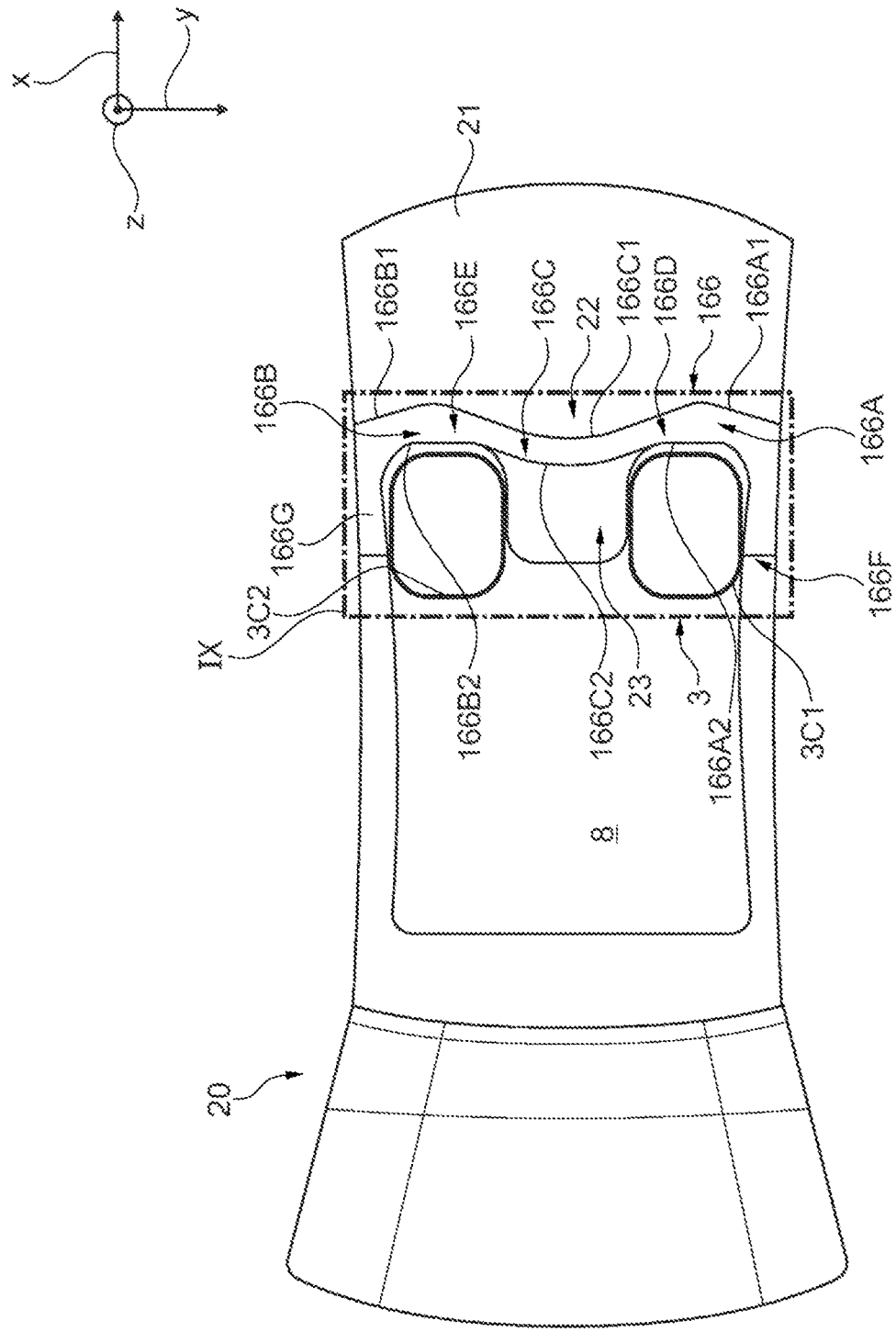
FIG. 8 shows a representation corresponding to FIG. 7 of a further embodiment of a transverse roof bow designed according to the invention.

FIG. 8 shows a further embodiment of the transverse roof bow 166 which has a course in the transverse direction y of the vehicle that corresponds to the course of the transverse roof bow 166 according to FIG. 7. In addition, the transverse roof bow 166 according to FIG. 8 in the region of the outer sides of the vehicle 20 comprises outer regions 166F and 166G which extend in the longitudinal direction of the vehicle x starting from the lateral ends of the lateral regions 166A and 166B. The shape of the transverse roof bow 166 in this case is designed such that the transverse roof bow 166 according to FIG. 8 encloses the head bells 3C1 and 3C2 above the second row of seats 3 in the transverse direction of the vehicle y on each side and in the longitudinal direction of the vehicle x from behind.

Figure 9:
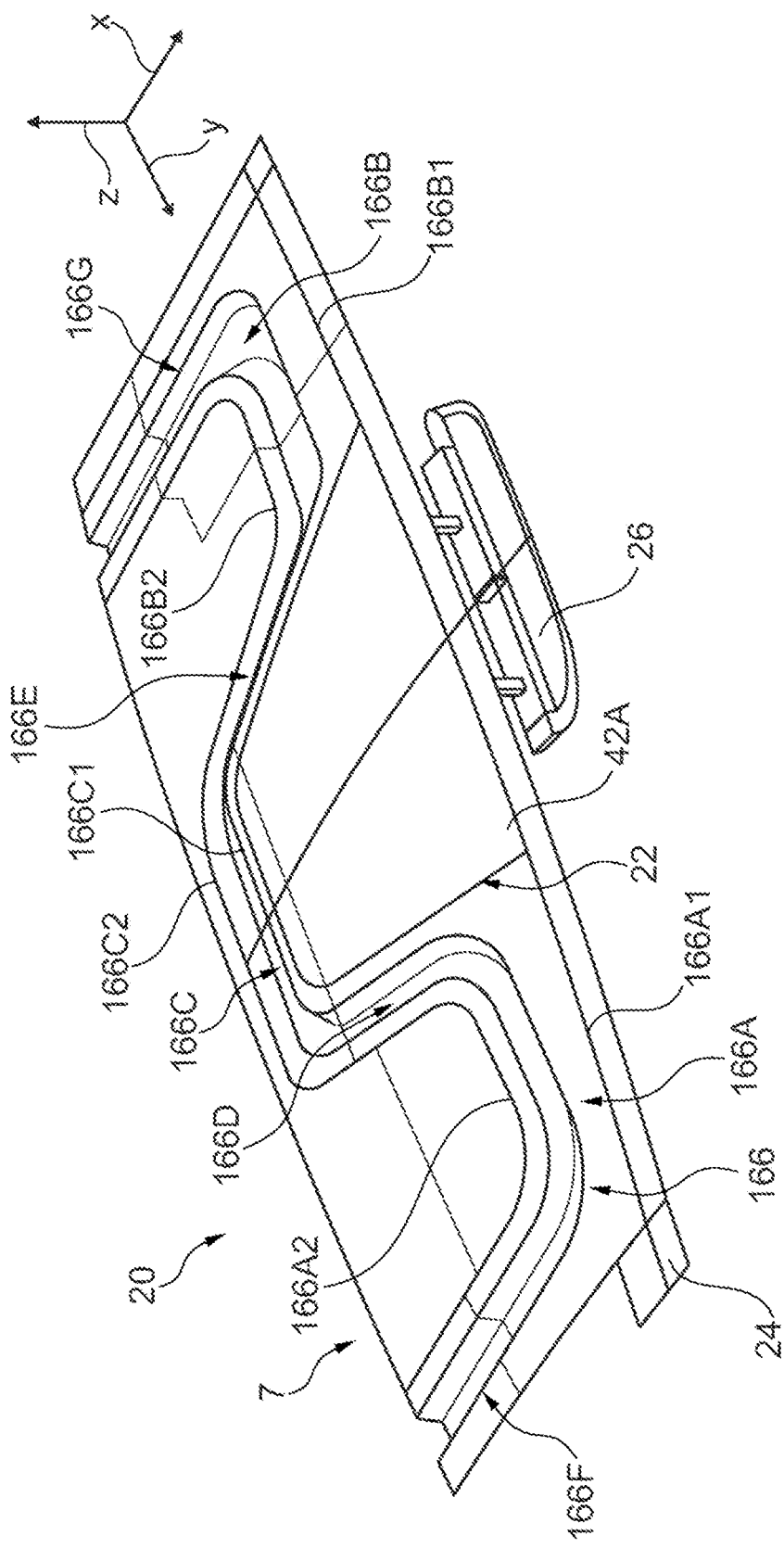
FIG. 9 shows a three-dimensional representation of a region IX which is identified in greater detail in FIG. 8 and which includes the transverse roof bow.
Figure 10:
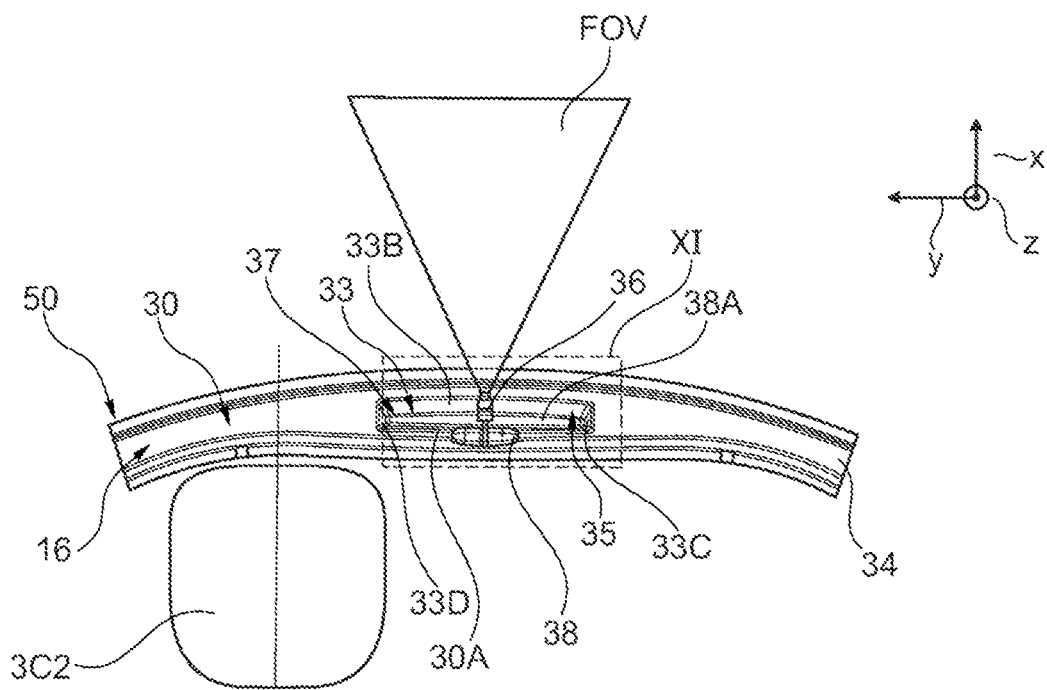
FIG. 10 shows a simplified partial representation of a transverse roof bow which is arranged in a region X which is identified in greater detail in FIG. 5.
Figure 11:
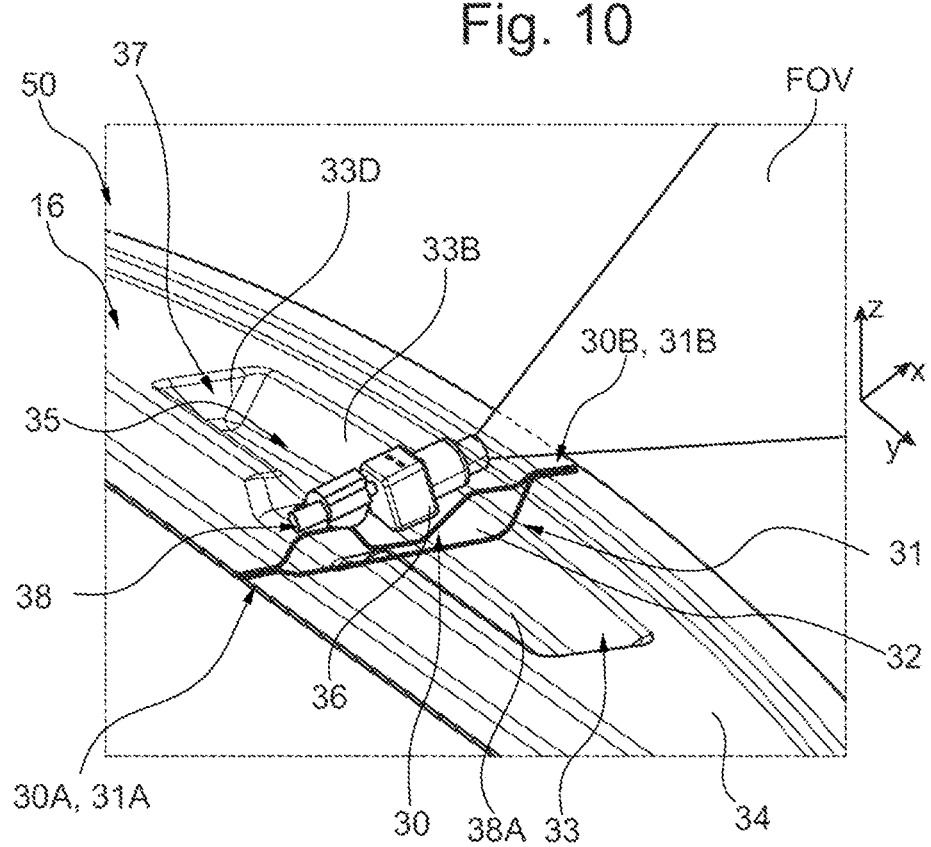
FIG. 11 shows an enlarged three-dimensional representation of a region XI of the transverse roof bow which is identified in greater detail in FIG. 10.

FIG. 9 shows a region IX of the vehicle 20 identified in greater detail in FIG. 8 as a simplified view from behind. It emerges from the illustration according to FIG. 9 that in the vertical direction of the vehicle z between the vehicle interior 8 and the transverse roof bow 166 there is an additional transverse roof bow 24, which covers a rectilinear course in the transverse direction of the vehicle y and ends with rear sides 166A1 and 166B1 of the lateral regions 166A and 166B. In the exemplary embodiment illustrated in FIG. 9, the vehicle roof 7 is produced from glass, with the region 23 being covered with a cover or plastic cover 42A in the vertical direction of the vehicle z. In addition, a brake light 26 is provided at the rear end of the installation space 22.

The transverse roof bows 15 and 17 may be formed in the region of the B-pillars 10, or also in the region of the D-pillars 12, as in the embodiments of the transverse roof bow 166 described in greater detail above. The vehicle roof 7 of the vehicle 1, or of the vehicle 20, can then be configured with the desired low height in each case, and yet still have the desired headroom for vehicle occupants in the region of the rows of seats 2 and 3, or in the region of the rows of seats 2 to 4, with simultaneously high rigidity of the vehicle body.

Unlike in the representation according to FIG. 9, in which the part of the vehicle roof 7 has a cutout in the region of the plastic cover 42A, it is also possible for the vehicle roof to be configured with a rectilinear course in the region where it meets the rear windshield 21 in the transverse direction of the vehicle y, in order to make it easier to produce. The transverse roof bow 166 may be positioned in relation to the joint region between the vehicle roof 7 and the side of the rear windshield 21, such that it faces the vehicle roof 7 in the longitudinal direction of the vehicle x, in such a way that the transverse roof bow 166 engages below the vehicle roof 7 and the rear windshield 21 over the entire vehicle width. The joint region is then supported over the entire width of the vehicle by the transverse roof bow 166 in the vertical direction of the vehicle z.

FIG. 10 to FIG. 13 show different representations of a further embodiment of the transverse roof bow 16 of the vehicle 20. The transverse roof bow 16 comprises an upper part 30 or an upper shell and a lower part 31 or a lower shell, which delimit a cavity 32. In order to improve the rigidity of the component, both the upper part 30 and the lower part 31 are each designed with a plurality of stampings 30A, 30B, 31A, 31B.

The upper part 30 is designed with a wall region 33 which projects or protrudes into the cavity 32 from an upper side 34 of the upper part 30, which adjoins the wall region 33, in the direction of the lower part 31. The wall region 33 delimits an installation space 35 for receiving an optical vehicle component, or a camera 36, in the vertical direction of the vehicle z, in the longitudinal direction of the vehicle x, and in the transverse direction of the vehicle y. The installation space 35 is configured with a receiving opening 37 in the region of the upper side 34 of the upper part 30, through which opening the camera 36 can be inserted into the installation space 35.

The wall region 33 of the upper part 30 has lateral wall sections 33A to 33D. The wall sections 33A to 33D run in the vertical direction of the vehicle y between the upper side 34 of the upper part and a floor section 38A which is arranged in the cavity 32. In addition, the wall sections 33 A to 33 B form an obtuse angle α with the upper side 34 of the upper part 30. The angle α varies in this case in a range from 90° to 135°, depending on the respective application. In the exemplary embodiment of the transverse roof bow 16 shown, the wall region 33 has a trapezoidal cross section in the longitudinal direction of the vehicle x and in the transverse direction of the vehicle.

The upper side 34 of the upper part 30 is designed with a recess 38 in the region of the lateral wall section 33A in the vertical direction of the vehicle z, the recess extending in the transverse direction of the vehicle y. In the region of the recess 38, the wall section 33A is designed with a lower height by comparison with the further wall sections 33B to 33D. The reduced height of the wall section 33A in the region of the recess 38 means that it is easily possible for the camera 36 to be connected to electrical devices of the vehicle 20, such as a power source, a control device or the like, via appropriate lines. During assembly, the signal lines can be routed with little effort below a cover 39 of the installation space 35 through the recess 38 from the installation space 35 in the direction of further electrical devices of this kind.

The cover 39 or the panel is provided above the installation space 35 and rests on the upper side 34 of the upper part 30. In this case, an upper side 40 of the cover 39 forms an outer skin of the vehicle 20. Furthermore, the cover 39 is designed with a scoop 41 or with a small fin, which rises in respect of the upper side 40 of the cover 39. The scoop 41 represents a cover for the region of the camera 36 which protrudes beyond the upper side 40 in the vertical direction of the vehicle z. In addition, the scoop 41 has an opening 42 adapted to the optical field of view (FOV), in which a transparent region for shielding the camera 36 from the surroundings 9 of the vehicle can be arranged. The surroundings 9 of the vehicle 20 can be captured without restriction over the entire optical field of view (FOV) of the camera 36 through a transparent region of this kind.

Figure 12:
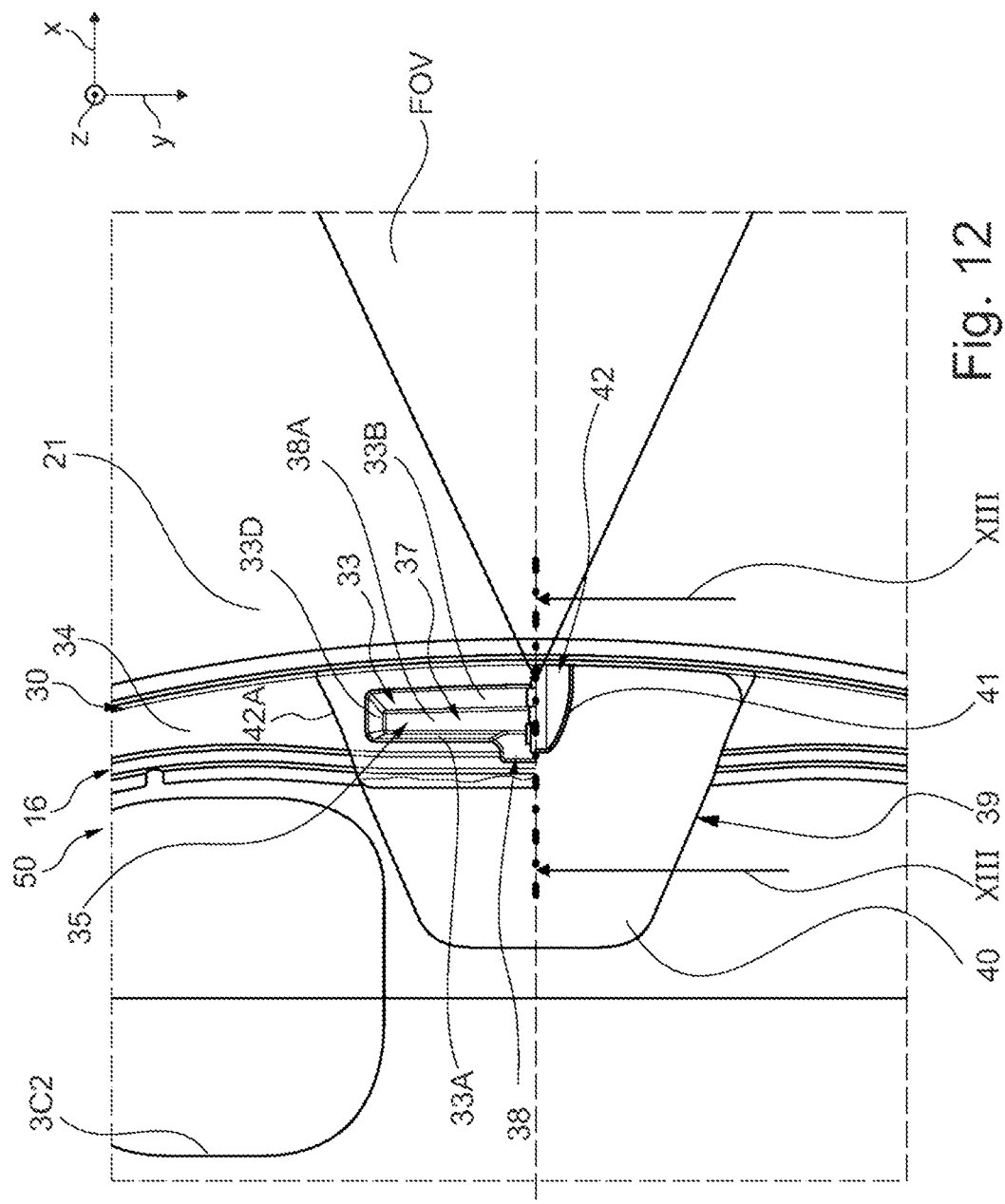
FIG. 12 shows a representation of the transverse roof bow corresponding to FIG. 10 with two differently designed covers.
Figure 13:
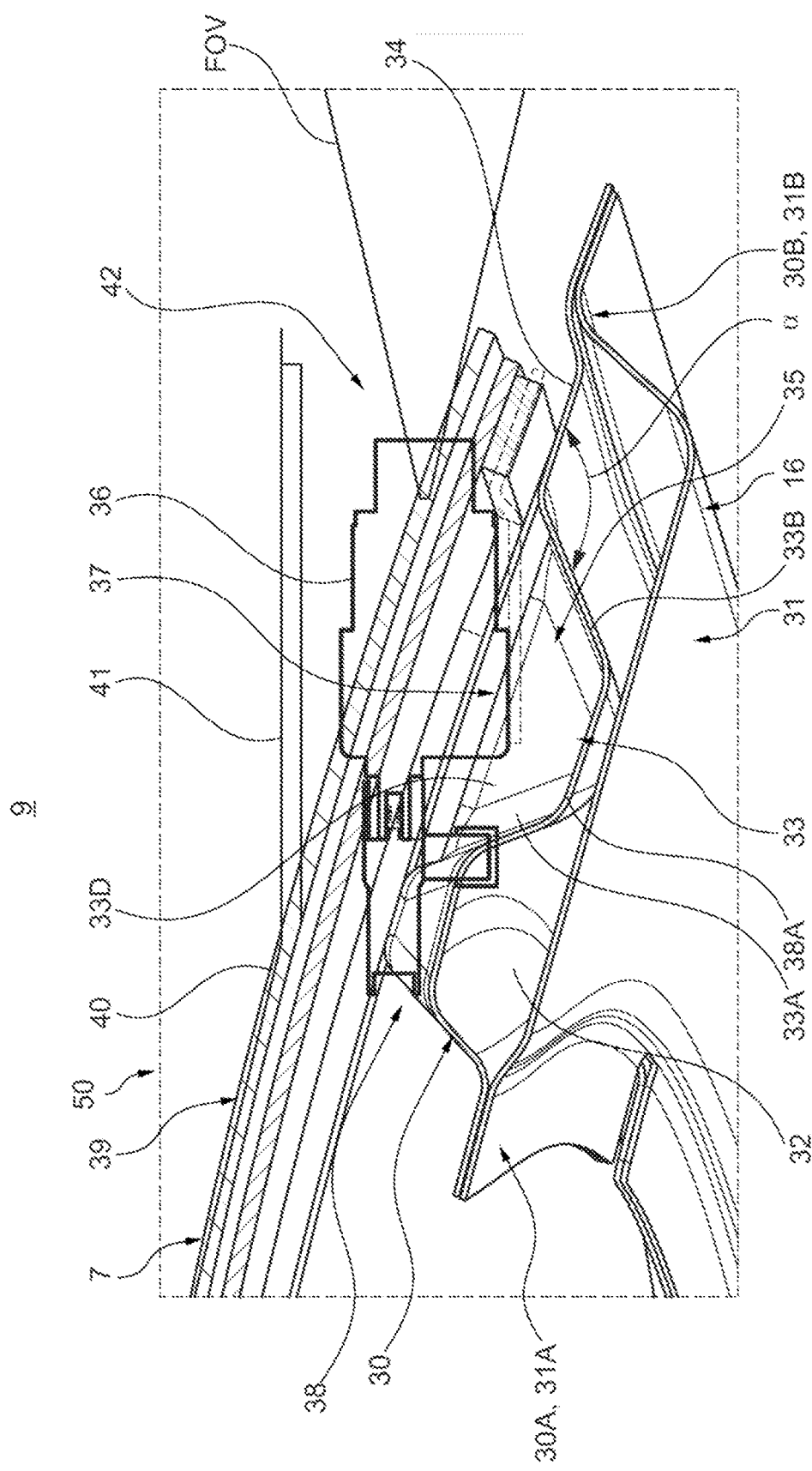
FIG. 13 shows a sectional view of the transverse roof bow along a sectional line XIII-XIII identified in greater detail in FIG. 12.

If the vehicle 20 is to be designed without the camera 36, instead of the cover 39 with the scoop 41, the cover or panel 42A without a scoop 41 can be provided to cover the installation space 35, which is likewise only shown in half in FIG. 12 in the transverse direction of the vehicle y alongside the cover 39 which is only shown in half.

In addition, or as an alternative to the embodiment of the transverse roof bow 16 shown in FIG. 10 to FIG. 13, with the deep-drawn wall region 33 of the upper part 30, for example, it is also possible for the transverse roof bow 14 in vehicles 1 and 20 or the transverse roof bow 166 according to FIG. 7 or according to FIG. 8 to be configured in the manner described above as the transverse roof bow 16 with a wall region and with an installation space delimited therefrom. A camera can then also be arranged, for example, in the front region of the vehicle roof 7 in the manner described in greater detail above, so that the area surrounding the front of the vehicle can be captured.

Furthermore, the transverse roof bow 17 of the vehicle 1 can also be configured in the manner described above with at least one wall region and with an installation space delimited therefrom, in order to receive a camera in the installation space.

In addition, the transverse roof bow 15 may also be designed with a wall region and with an installation space delimited therefrom, so that an optical vehicle component, or another vehicle component, such as an antenna or the like, can be arranged therein.

In addition, it may also be provided that the wall region in the transverse roof bow is arranged eccentrically in the transverse direction of the vehicle y. Moreover, it is also possible for at least one of the transverse roof bows to be configured with multiple wall regions and therefore also with multiple installation spaces which are spaced apart from one another in the transverse direction of the vehicle.

The invention claimed is:

1. A vehicle, comprising:
a transverse roof bow extending in a transverse direction of the vehicle, wherein
the transverse roof bow is located above a seat region for vehicle occupants in a vertical direction of the vehicle, and adjoins, at least in some regions, a region of a vehicle interior from behind in the longitudinal direction of the vehicle, said region representing a free space for a head of a vehicle occupant to move,
the transverse roof bow has two lateral regions and a central region connected thereto,
the central region extends in the transverse direction of the vehicle, and is connected to the lateral regions in each case via a transitional region,
the transitional regions extend toward a rear side of the vehicle obliquely between the lateral regions and the central region, and
a front side of the central region in the longitudinal direction of the vehicle is spaced apart from front sides of the lateral regions,
wherein the two lateral regions extend obliquely forward between the transition regions and an outer side of the vehicle.

2. The vehicle according to claim 1, wherein
a rear side of the central region is spaced apart from rear sides of the lateral regions in the longitudinal direction of the vehicle.

3. The vehicle according to claim 2, further comprising:
a vehicle component for capturing an image of an area surrounding the vehicle and/or for establishing a radio link between a further vehicle component and an external device, wherein
the vehicle component is provided in a region of the vehicle interior which is arranged in the longitudinal direction of the vehicle behind the rear side of the central region of the transverse roof bow and in the transverse direction of the vehicle between the lateral regions.

4. The vehicle according to claim 3, wherein
the vehicle component is arranged in the vertical direction of the vehicle below the vehicle roof and/or a rear windshield.

5. The vehicle according to claim 2, wherein
the transverse roof bow is arranged in the longitudinal direction of the vehicle below a connection region between a first roof part and a second roof part of the vehicle roof.

6. The vehicle according to claim 5, wherein
the rear windshield is provided with an opaque layer, at least above the connection region to the vehicle roof and above the transverse roof bow.

7. The vehicle according to claim 2, wherein
the transverse roof bow is arranged in the longitudinal direction of the vehicle below a connection region between a rear windshield and the vehicle roof.

8. The vehicle according to claim 7, wherein
the rear windshield is provided with an opaque layer, at least above the connection region to the vehicle roof and above the transverse roof bow.

9. The vehicle according to claim 7, wherein
a front side of the transverse roof bow is positioned higher in the vertical direction of the vehicle than the rear side of the transverse roof bow.

10. The vehicle according to claim 1, wherein
the vehicle roof is produced from glass, metal, or a composite material.

11. The vehicle according to claim 1, wherein
the transverse roof bow is operatively connected to B, C or D-pillars of the vehicle in the region of the vehicle sides.

12. The vehicle according to claim 1, wherein
the transverse roof bow is configured with outer regions which each extend above the vehicle body in the region of the outer sides of the vehicle in the longitudinal direction of the vehicle, wherein the outer regions are operatively connected to ends of the lateral regions of the transverse roof bow, which each face the outer sides of the vehicle.

* * * * *